Dec. 12, 1950     L. J. WELLS     2,533,305
FLEXIBLE POURING SPOUT STRUCTURE
FOR LIQUID CONTAINERS
Filed June 18, 1946     2 Sheets—Sheet 1
FIG./.
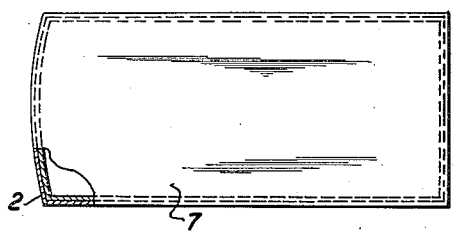
FIG.2.
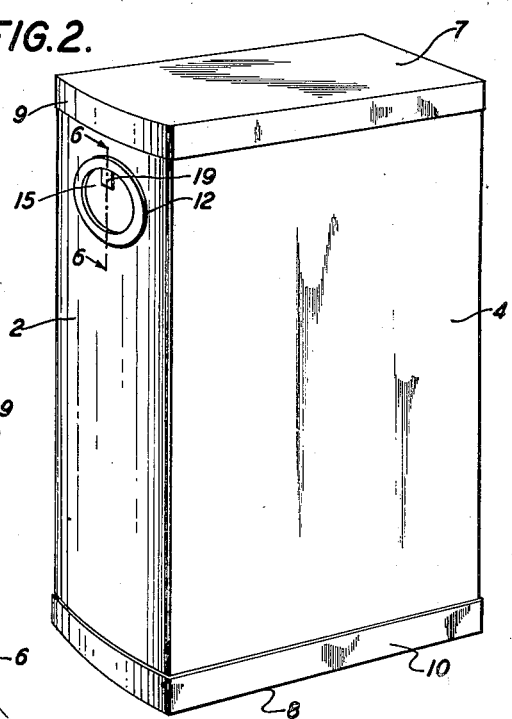
FIG.3.
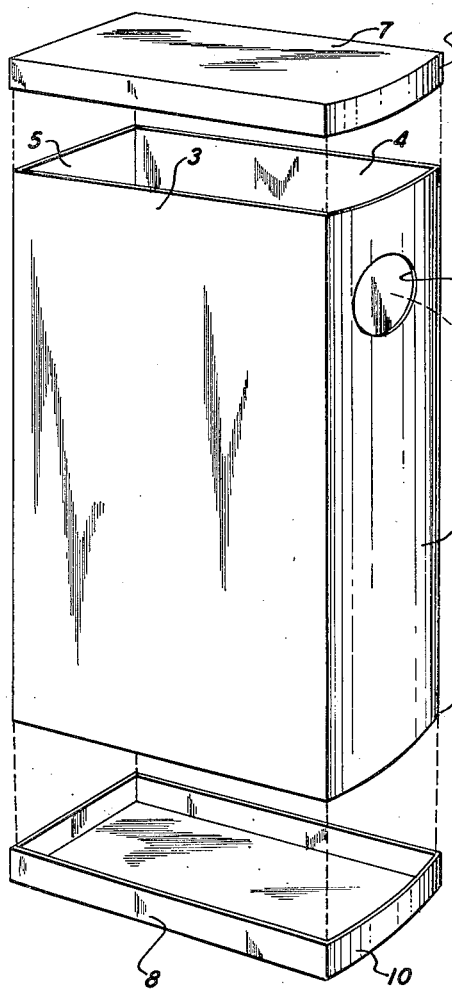
FIG.7.
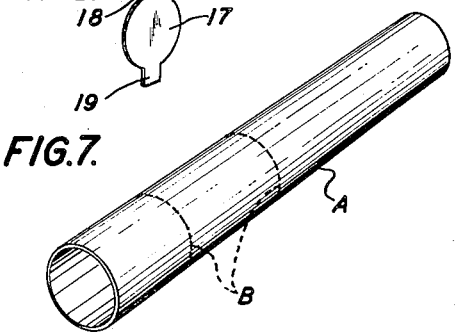
INVENTOR.
LLOYD J. WELLS
BY Earl E Moore
ATTORNEY Dec. 12, 1950     L. J. WELLS     2,533,305
FLEXIBLE POURING SPOUT STRUCTURE
FOR LIQUID CONTAINERS
Filed June 18, 1946     2 Sheets-Sheet 2
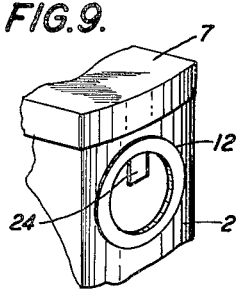
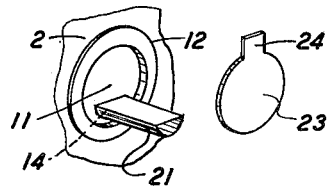
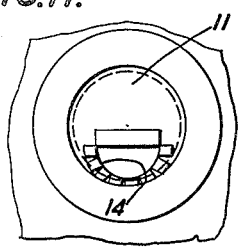
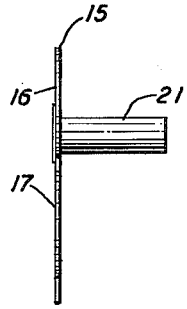
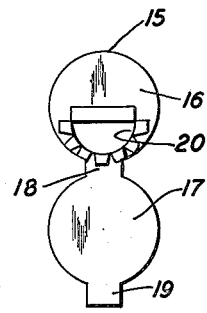
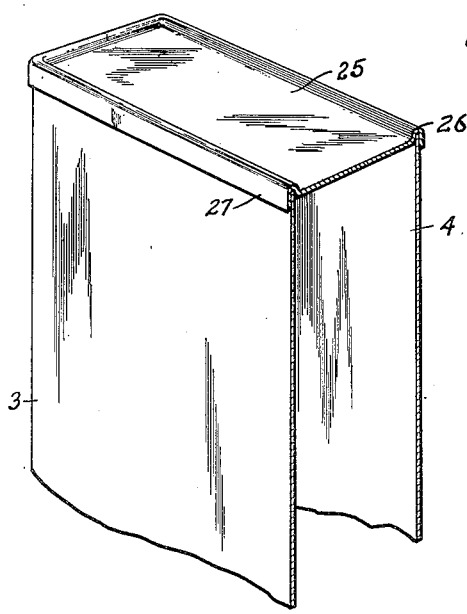
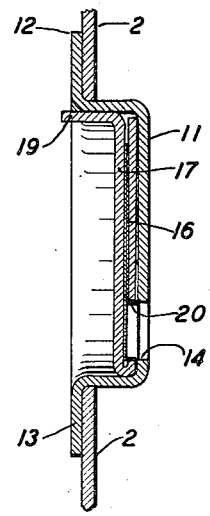
INVENTOR.
LLOYD. J. WELLS
BY Earl E Moore
ATTORNEY Patented Dec. 12, 1950

2,533,305

UNITED STATES PATENT OFFICE 2,533,305

FLEXIBLE POURING SPOUT STRUCTURE FOR LIQUID CONTAINERS

Lloyd J. Wells, El Monte, Calif.

Application June 18, 1946, Serial No. 677,553

10 Claims. (Cl. 222—528)

This invention relates to containers which are especially adapted to carry liquids in a sanitary and safe manner. The container herein disclosed may be made of any suitable light weight materials such as paper, cardboard, plastics, and even light weight metals. The container illustrated, however, is made of waxed paper and the like, and the container is sized and shaped so as to contain the most liquid in the least space commensurate with the desired shape to nicely fit the average person's hand so that the container can be easily handled and gripped.

The container of this invention is especially useful as a milk container or bottle and is provided with an automatic self-sealing pouring spout, a feature which avoids much of the dripping from such containers, and provides a reliable barrier to insects; the pouring spout being located at the cream-line so that the cream can be taken from the top of the milk without vision through the walls of the container, but in the event the container of this invention is made from any of the well known transparent plastics, the pouring spout may be placed at the highest level of the container along any of the side walls, or even the top wall thereof.

The container herein disclosed is designed for ease in volume production in that the container lengths can be cut from long cylindrical seamless tubing perforated as desired, and pressed to shape upon a mandrel, the top and bottom walls can then be molded and pressed in position on forms as the containers leave the mandrel. When the above is performed under proper heat conditions, the wax upon the paper automatically seals all seams so that leakage is prevented and the container is ready for its supply of liquid through the perforation which is at the high level of the container.

One of the principal objects of this invention is to present a new and novel liquid container which is sanitary, safe, sized and shaped for economy in material and for handling, and which is economical to make and manufacture with a minimum outlay of capital.

Another object is to provide a paper liquid container with an automatic self-sealing pouring spout which is leakproof, dirt proof, and which prevents insects from entering the container even though the spout has been frequently used, and provide a one time use container which is free of any metal parts.

Other objects, advantages and features of my invention will appear from the accompanying drawings, the subjoined detailed description, the preamble of these specifications and the appended claims.

Applicant is about to illustrate and describe one of the forms of his invention in order to teach one how to make and use the same, but it is to be understood that the drawings and description thereof are not to limit the invention in any sense whatsoever, except as limited by the appended claims.

In the drawings, the liquid carrier or container is shown as made of heavy waxed paper and includes the following figures:

Fig. 1 is a top plan view of the container,

Fig. 2 is a front perspective view thereof showing the pouring spout thereof sealed, Fig. 3 is a perspective view from the opposite side of that shown in Fig. 2, the top and bottom closure parts being shown as separated from the main body portion of the container, and the pouring spout feature is shown as removed from the container and the parts thereof separated, Fig. 4 is a side elevational view of the cap and spout portion of the container, Fig. 5 is a rear elevational view of the cap and spout portion, Fig. 6 is an enlarged sectional view taken substantially along line 6—6 of Fig. 2, Fig. 7 is a cylindrical tube, the dotted lines indicating the cuts to be made therefrom, this figure being shown on a much smaller scale than the other figures, Fig. 8 is a perspective view with a well removed showing a modified form of container, Fig. 9 is a perspective view of a portion of a container showing another slightly modified form of the invention, Fig. 10 is a front elevational view of Fig. 9 showing cap removed and spout extended, Fig. 11 is a rear elevational view of Fig. 10, but on an enlarged scale, Fig. 12 is a sectional view of that shown in Fig. 11.

The container has the main body portion 1 formed from a tube or cylinder of waxed heavy paper as indicated at A, the tube A being a long length of such tubing, the dotted lines B indicating the cuts to be made in order to obtain the proper lengths for the body 1. After the sections are cut from the long tube A, they are formed on a mandrel under pressure so as to have the front slightly curved wall 2, side flat walls 3 and 4, and the rear flat wall 5, as shown clearly in Fig. 3. The upper portion of the front curved wall has an opening 6, which, in this particular showing, is round. This opening is located at the normal cream line when the container is to be used for carrying milk.

A preformed and flanged top closure wall 7 and a similar bottom preformed and flanged closure wall 8 are employed to seal the top and bottom of the main body 1. The annular flanges 9 and 10 of the walls 7 and 8, respectively, are integral with their respective walls and the entire surfaces of both walls and their flanges are thoroughly covered with wax in order to be liquid tight and also for the following purposes: to make a perfect liquid tight seal with the body portion 1 when the top and bottom walls are pressed onto their respective ends of the body 1, sufficient heat being applied to run the wax of the flanges and the body 1 together and complete the sealing. Note, that the flange at one end of each of the closure walls is curved slightly to match the front curved wall 2 of the main body 1.

Within the opening 6 is forced the recessed portion 11 of the insert member 12, the annular flange 13 of the member being forced into perfect contact with the marginal portions of the opening; by applying some heat in this operation, the flange 13 will cement itself to the wall 2 about the opening 6. The recessed portion 11 has a wall with an opening 14, preferably shaped as shown, through which the contents of the container is poured.

An element 15 is designed and sized to fit within the recessed portion 11, that is, when the element 15 is folded as shown clearly in Fig. 6. This element has the two rounded parts 16 and 17 joined together by the neck portion 18, the part 17 having a tab or finger pull 19. The part 16 has an opening 20 which is the same size and shape as the opening 14, the two of them being arranged for registration when the member 15 is pressed into the recessed portion 11. A flexible pouring spout 21 is attached to the back of the member 16 by heat and pressure thereon which embeds the spout ends into the wax on member 15, note Fig. 5. The pouring spout has an opening therethrough, which is obvious, the front portion of which is indicated at 22. The material of the pouring spout may be of any kind and type suitable for the purpose, but it is preferred to use cellophane and like materials in that cellophane seals itself after once becoming wet, thus providing an automatic sealing spout for the container.

Figs. 9, 10, 11 and 12 show a slightly modified form of the invention wherein the pouring spout is attached directly to the member 12 after one end is passed through the opening 14 thereof. The same spout 21 is used in this form of the invention. When the spout is folded against the recessed wall 11, for instance, after the container has been filled with milk and the member 12 forced thereon, the cap 23 is then forced into the recessed portion of the member 12 with the tab 24 thereof positioned as shown in Fig. 9.

The modified form of the invention shown in Fig. 8 concerns only the top and bottom closures of the container; each one of these closures comprising the depressed portion 25 which forms a perimetrical groove 26 to receive the ends of the container, as shown, the perimetrical flange 27 neatly and snugly engaging the sides of the container to be sealed thereto when the wax thereon is heated and allowed to run together. In this form of the invention, the side walls of the container are not so apt to become separated from the top or bottom closure members.

It is, of course, understood that various changes and modifications may be made in the details of form, style, design and construction of the whole or any part of the specifically described embodiment of this invention without departing from the spirit thereof, such changes and modifications being restricted only by the limitations clearly expressed in the following claims.

Having thus described my invention, what is claimed as new and desired to be secured by Letters Patent is:

1. In a liquid container the combination of: a container wall having an opening therein; a cup-like, countersunk insert member secured in said opening and providing an exteriorly directed recess and having a flange sealed on the said wall of said container, said insert member having an opening therein to communicate with a spout; a flexible, collapsible tubular spout disposed in communication with said opening in said insert member, said spout being of relatively small transverse dimension compared with that of said recess whereby opposing inner walls of said spout fold into contact with one another to prevent flow through said spout, said spout being short enough for folding entirely within said recess; and friction closure cap means fitting snugly within the walls of said recess in said countersunk insert member and outside said spout, when folded, for retention of said spout in folded condition within said recess.

2. A combination as in claim 1 including a cap element having an opening therein and tightly held within said walls of said recess to underlie said closure cap means, the inner end of said spout being secured and sealed to said cap element adjacent the edges of its opening, the latter opening being adapted to register approximately with the opening in said insert member.

3. A combination as in claim 2 wherein said closure cap means is attached to said cap element by hinge means, said closure cap means providing means to draw the latter outward on said hinge means.

4. A combination as in claim 1 wherein said spout is formed from cellophane which is self-sealing after becoming wet with milk and cream.

5. A combination as in claim 1 wherein said spout has its inner end secured to the bottom of said insert member adjacent the opening therein.

6. In combination in liquid dispensing carton means: a main wall having a countersunk portion providing an inset back wall and an annular wall carrying said back wall and forming a recess, said back wall having a liquid-passing opening; a somewhat elongated, flexible, liquid-impervious, tubular spout having its inner end disposed adjacent said opening in liquid-dispensing communication therewith, said spout being short enough to fold over upon itself within said recess and having a cross section materially less than the diameter of said recess whereby diametrically opposed inner walls of said spout collapse into contact with each other when said spout is folded upon itself and cut off liquid passage therethrough; and closure cap means of a size to fit snugly into said recess in engagement with said annular wall and outside said spout to retain said spout in folded, closed position within said recess.

7. A combination as in claim 6 wherein said spout is formed from cellophane which is self-sealing after becoming wet with milk and cream.

8. A combination as in claim 6 wherein said spout has its inner end secured to the wall at the bottom of said recess adjacent the opening therein.

9. In combination in liquid dispensing carton means: a main wall having a countersunk portion providing an inset back wall and an annular wall carrying said back wall and forming a recess, said back wall having a liquid-passing opening; a somewhat elongated, flexible, liquid-impervious, tubular spout having its inner end disposed adjacent said opening in liquid-dispensing communication therewith, said spout being short enough to fold over upon itself within said recess and having a cross section materially less than the diameter of said recess whereby inner walls of said spout collapse into contact with each other when folded and cut off liquid passage therethrough; closure cap means of a size to fit snugly into said recess in engagement with said annular wall and outside said spout to retain said spout in folded, closed position within said recess; and a cap element having an opening therein and tightly held within the walls of said recess to underlie said closure cap means, the inner end of said spout being secured and sealed to said cap element adjacent the edges of its opening, the latter opening being adapted to register approximately with the opening in said back wall.

10. A combination as in claim 9 wherein said closure cap means is attached to said cap element by hinge means, said closure cap means providing means to draw the latter outward on said hinge means.

LLOYD J. WELLS.

REFERENCES CITED

The following references are of record in the file of this patent:

UNITED STATES PATENTS

| Number | Name | Date |
| --- | --- | --- |
| 824,297 | Hopkins et al. | June 26, 1906 |
| 1,804,627 | Lukenbill | May 12, 1931 |
| 2,154,584 | Rossi | Apr. 18, 1939 |
| 2,184,215 | Geyer | Dec. 19, 1939 |
| 2,202,652 | Glidden | May 28, 1940 |
| 2,305,081 | Henchert | Dec. 15, 1942 |
| 2,337,257 | Levingston | Dec. 21, 1943 |